Patented Apr. 22, 1930

1,755,179

UNITED STATES PATENT OFFICE

FRITZ GÜNTHER, OF LUDWIGSHAFEN-ON-THE-RHINE, GERMANY, ASSIGNOR TO I. G. FARBENINDUSTRIE AKTIENGESELLSCHAFT, OF FRANKFORT-ON-THE-MAIN, GERMANY, A CORPORATION OF GERMANY

SULPHONIC ACIDS OF HIGH WETTING, CLEANING, AND EMULSIFYING POWER

No Drawing. Application filed December 28, 1926, Serial No. 157,613, and in Germany December 28, 1925.

I have found that sulphonic acids of aromatic hydrocarbons or their derivatives which are substituted by at least two different non-aromatic, i. e. aliphatic or hydroaromatic radicals (which radicals may also contain other substituents) possess very good wetting, cleaning and emulsifying properties both in the form of free acids and of salts. By reason of these properties they may be employed for example as substitutes for soaps, as wetting agents, in dyeing or fulling in neutral or alkaline, and especially also in acid baths, in carbonizing wool and in many other treatments of textile fibres, leather and other industrial materials of animal, vegetable or mineral origin. The said sulphonic acids are also very suitable for catalytically saponifying fats and the like. It is often advantageous to employ the said sulphonic acids or their salts in conjunction with water-soluble salts of other organic, or inorganic acids or with organic solvents such for example as alcohols, hydrocarbons, ketones and others. When the sulphonic acids or their salts are employed in conjunction with water and organic liquids insoluble in water of any kind, the latter are converted into stable emulsions or in some cases even into clear solutions. The emulsifying and other properties of the sulphonic acids and their salts are often increased by employing them in conjunction with protective colloids such as glue, gelatine, gum arabic and the like. Mixtures of the sulphonic acids or their salts with soaps, Turkey red oil or other soap-like materials may also be employed with advantage, for example in acid baths.

According to my present invention the said sulphonic acids are prepared by condensing an aromatic hydrocarbon or a sulphonic acid derived therefrom with two or more aliphatic or hydroaromatic alcohols either simultaneously or one after the other, and subsequently sulphonating the product, if necessary. Instead of alcohols, other aliphatic or hydroaromatic compounds containing interchangeable substituents, such for example as the chlorides or other halogenides, or other derivatives proper to effect introduction of an alkyl radical, may be employed. The alcohols or other compounds with interchangeable substituents may contain other substituents. The condensation with the alcohol or other suitable compound may be effected with or without the aid of condensing agents such for example as sulfuric acid, chlorsulphonic acid, fuming sulfuric acid, phosphoric acid, and the like. Instead of aromatic hydrocarbons or their sulphonic acids, derivatives thereof such as hydroxyl, nitro, amino, alkyl-amino, halogen, carboxyl and other derivatives thereof, whether sulphonated or not, may be employed. Sulphonation of the aromatic hydrocarbon may also take place simultaneously with the condensation with the alcohols or other suitable compounds. The aromatic hydrocarbons or their sulphonic acids may be mono- or polynuclear and my invention is applicable to benzene hydrocarbons as well as to naphthalene and other polynuclear hydrocarbons or their sulphonic acid derivatives. Particularly valuable sulphonic acids are those which contain at least one isopropyl or butyl group or even one or more of each of these groups.

The following example will further illustrate how my invention may be carried out in practice, but the invention is not limited to this example. The parts are by weight.

Example 256 parts of napthalene are converted into betanaphthalene sulphonic acid by treatment with 400 parts of sulfuric acid of 66° Bé. at 160° C. The reaction mixture is allowed to cool to about 100° C., whereupon at between 100° and 105° C. a mixture of 148 parts of normal butyl alcohol and 126 parts of isopropyl alcohol and simultaneously therewith 412 parts of sulfuric acid of 66° Bé. are run in, while stirring well, in the course of from 2 to 3 hours. The reaction is completed by further stirring for several hours at the said temperature. When the reaction product is allowed to cool, it separates into two layers, the upper of which is separated and neutralized by means of caustic soda solution. On evaporation a product of very good wetting power is obtained.

What I claim is:

1. The process of producing sulphonic acids of high wetting, cleaning and emulsifying power which comprises condensing an aromatic hydrocarbon with at least two different derivatives of non-aromatic hydrocarbons and sulphonating in a stage of the process.

2. The process of producing sulphonic acids of high wetting, cleaning and emulsifying power which comprises condensing an aromatic hydrocarbon with at least two different non-aromatic alcohols and sulphonating in a stage of the process.

3. The process of producing sulphonic acids of high wetting, cleaning and emulsifying power which comprises condensing an aromatic sulphonic acid with a least two different non-aromatic alcohols.

4. The process of producing sulphonic acids of high wetting, cleaning and emulsifying power which comprises condensing a napthalene sulphonic acid with a mixture of isopropyl alcohol and a butyl alcohol.

5. As a new article of manufacture, aromatic sulphonic acids substituted by at least one propyl and at least one butyl group.

6. As new articles of manufacture compounds containing an aromatic sulphonic acid nucleus substituted by at least one propyl and at least one butyl group.

In testimony whereof I have hereunto set my hand.

FRITZ GÜNTHER.